Feb. 16, 1932.   E. M. JONES   1,845,919
APPARATUS FOR VENDING PACKAGED MATERIALS
Filed March 7, 1929   9 Sheets-Sheet 1

Fig. 1.

INVENTOR
ELMER M. JONES
BY
James L. Norris
ATTORNEY

Feb. 16, 1932.   E. M. JONES   1,845,919
APPARATUS FOR VENDING PACKAGED MATERIALS
Filed March 7, 1929   9 Sheets-Sheet 4

INVENTOR
ELMER M. JONES
BY
James L. Norris
ATTORNEY

Feb. 16, 1932.  E. M. JONES  1,845,919
APPARATUS FOR VENDING PACKAGED MATERIALS
Filed March 7, 1929   9 Sheets-Sheet 8

INVENTOR
ELMER M. JONES
BY James L. Norris
ATTORNEY

Patented Feb. 16, 1932

1,845,919

UNITED STATES PATENT OFFICE

ELMER M. JONES, OF ATLANTA, GEORGIA, ASSIGNOR TO CLARA K. ANNEBERG, OF ATLANTA, GEORGIA

APPARATUS FOR VENDING PACKAGED MATERIALS

Application filed March 7, 1929. Serial No. 345,118.

The present invention relates to improvements in apparatus for vending packaged material, one object of the invention being the provision of an apparatus which is operable, upon the deposit therein of a coin representing the value of both a container and the contents of such container, to deliver to the purchaser a filled container and a refund check representing the value of the empty container and which will automatically refund to the purchaser the value of the empty container upon the deposit therein of the empty container and such refund check.

Another object of this invention is the provision of a vending machine of this character comprising a cabinet to contain a plurality of packages, such as bottles of softdrinks, milk, or the like, and adapted to sequentially deliver such packages at the outlet end of the same, such machine including a receptacle for the pre-cooled bottles or containers, and a receptacle for the empty containers, as well as a coin-controlled mechanism for delivering to the purchaser a filled container or bottle and a refund check, said machine also having means, operative upon the deposit therein of the empty container or bottle and the refund check, to refund the value of the empty container.

Still another object of this invention is the provision of a coin-controlled mechanism in which the coin acts as an intermediary for actuating a connecting medium between a main door-actuated means, and the means for rendering the filled packages accessible, said main door also controlling access to the main delivery compartment of the apparatus where the purchaser has selective access to the filled packages or bottles, but which selection is not permissible until after the coin has been dropped and mechanism normally preventing access to the packages has been released by the opening of the main door, to permit the purchaser to gain access to a single container or bottle, the latter mechanism operating a refund check delivery mechanism so that the purchaser receives with each bottle or container a refund check.

Still another object of the present invention is the provision of a refund check controlled mechanism as well as an empty container or bottle return mechanism which necessitates the simultaneous deposit of the refund check and the empty bottle or container and the manual manipulation of the bottle container for operating a refund coin delivery mechanism.

Still another object of this invention is the employment of the package-dispensing apparatus forming the subject matter of my U. S. Patent No. 1,804,534, dated May 12, 1931, with the coin-actuated mechanism herein set forth.

With the foregoing and other objects in view, which will appear as the description proceeds, the invention resides in the combination and arrangements of parts and in the details of construction hereinafter described and claimed, it being understood that changes in the precise embodiment of the invention herein disclosed can be made within the scope of what is claimed without departing from the spirit of the invention.

In the accompanying drawings:—

Cabinet

Referring to the drawings, the numeral 30 designates the main cabinet which, as here shown, is provided in its lower portion with a central vertical partition 31 dividing said lower portion into the pre-cooling filled container chamber 32 and the empty container chamber 33. A transverse and horizontal partition 34 forms the top of these chambers and provides in the upper portion of the cabinet the main chamber 35, which is the vending chamber of the apparatus, and the two ice-receiving chambers 36 and 36' which are separated from the chamber 35 by the foraminous partitions 36ª. Mounted upon the top of the cabinet is a display auxiliary cabinet 37 in which the various goods that are vended or sold by the present apparatus are observable through windows in the ends and front of said auxiliary cabinet. A lid 37' is provided for an opening in the rear portion of the top of the cabinet, through which opening bottles or containers may be placed in the cabinet, and an opening in the lower portion of the rear side of the compartment is closed by a door 33'.

A horizontal rod 39 is hingedly journalled at 40 and 40' to the upper forward portion of the cabinet above an opening in the latter and carries the main door 41 for said opening so that said rod is rocked or moved by the opening and closing of said door, a hand bar 42 being mounted on the door by which the door may be readily raised or lowered. One end of the rod 39 extends into the coin-receiving casing 43 which is secured by means of the plate 44 to the auxiliary cabinet and is provided with the coin-receiving recess 45.

*Coin-control mechanism*

The coin-control mechanism includes, in addition to a coin-receiving recess 45, a coin slot 46, and a double-armed member 47 connected to and movable with the inner end of the rod 39 and having the segmental abutment 48 at one end and the abutment 49 and hook 50 at the opposite end thereof, the purposes of which will presently appear.

A pin 51 is carried by the member 47 and is connected to a link 52 which is provided with a slot 53 slidable upon the pin 54, carried by one end of a link 55 and extending through the upper end of the lever 56.

A pair of members 58 and 59' are slidable in horizontal guideways 60 formed in a frame 57 fixedly secured in the cabinet. The member 58 has a longitudinal slot 58', and the rear end of the link 55 is pivoted on a pin 59 projecting laterally from the member 59' through said slot. A lever 61 is pivoted at 61' to the member 59' between the ends of the latter, and a spring 62 between the forward end 63 of said lever and the upper guideway 60 of the frame 57 normally holds the forward end of said lever depressed and the rear end of said lever elevated.

Figure 1:
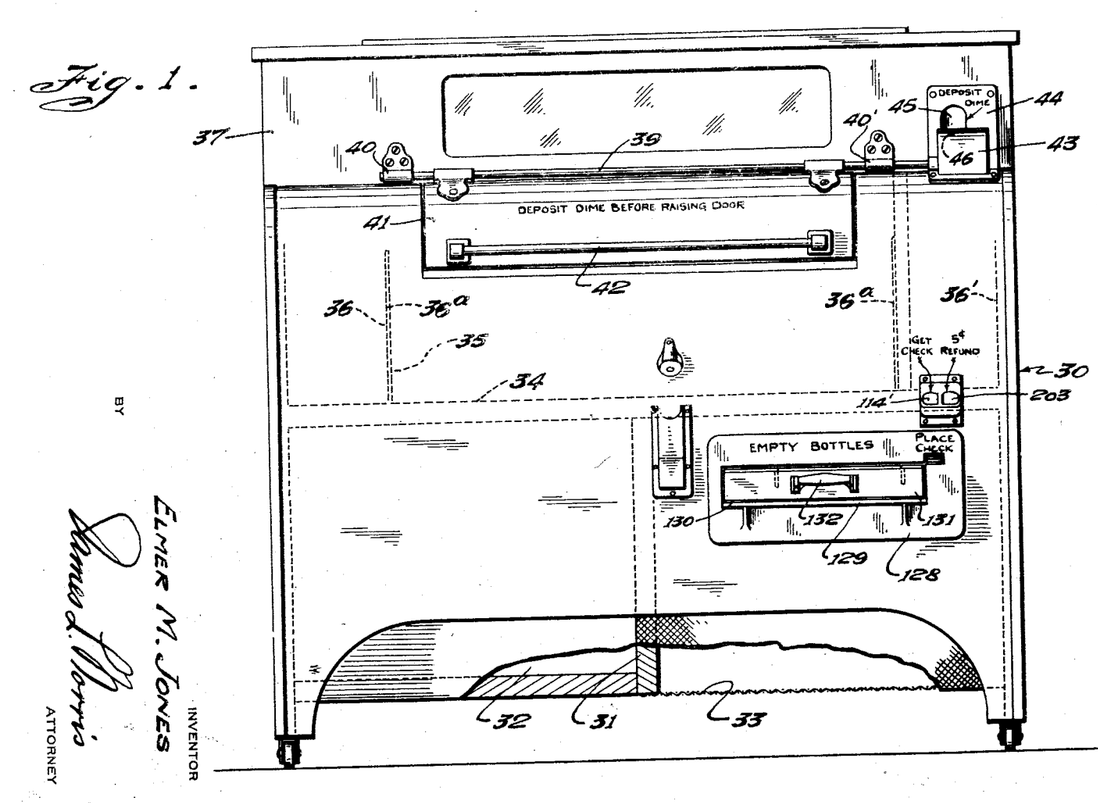
Figure 1 is a front elevation of the complete cabinet of the present mechanism, the portions adjacent the lower part of the front wall and bottom being broken away to show the interior.
Figure 2:
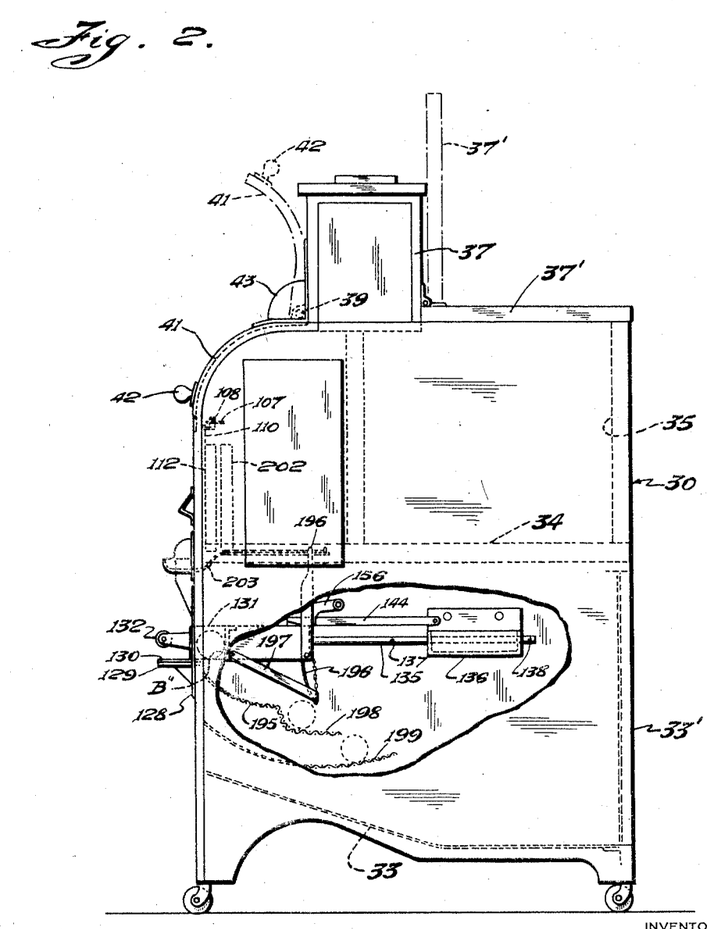
Figure 2 is an end elevation of the cabinet as viewed in Figure 1 from the right, a portion of the cabinet adjacent the empty bottle receptacle being broken away to show the interior thereof.
Figures 3, 4:
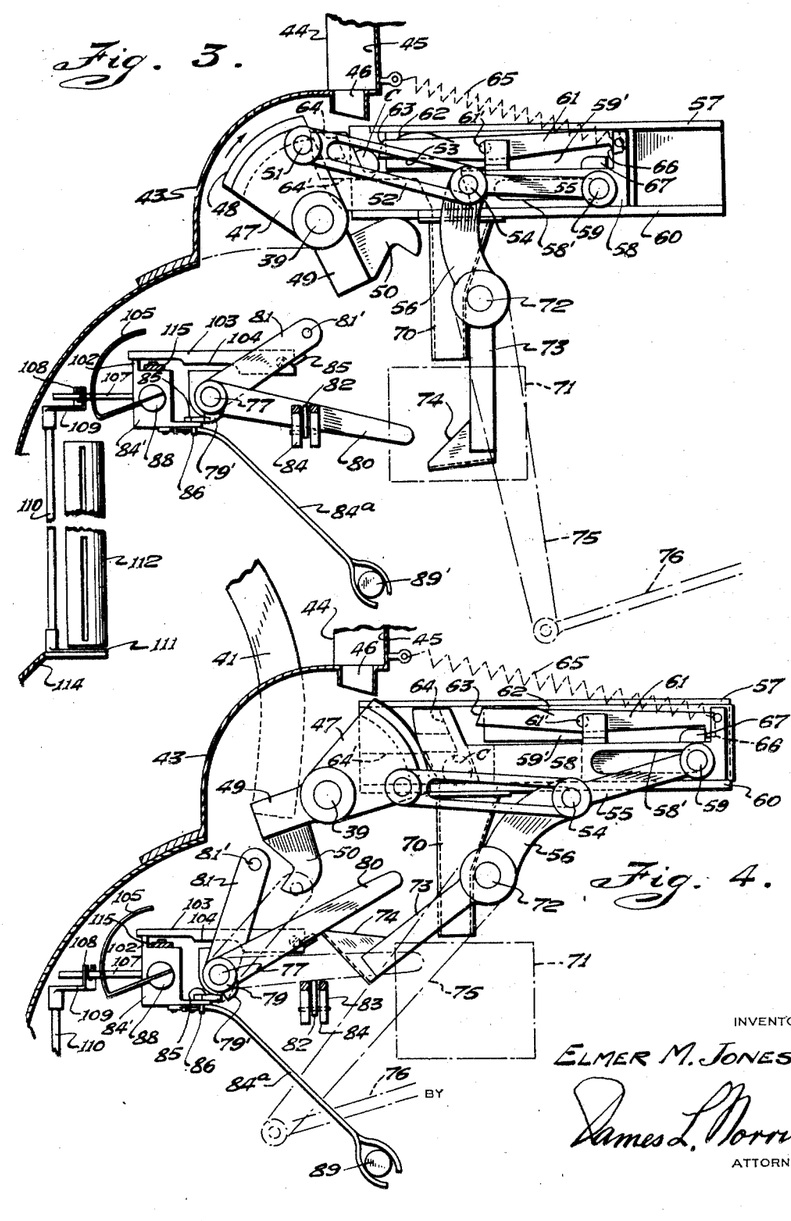
Figure 3 is a view partly in side elevation and partly in section of a portion of the coin controlled mechanism showing the parts in the position they assume immediately after a coin is inserted in the slot and just prior to the opening of the main door.
Figure 4 is a view similar to Figure 3 showing the parts in the position they assume at the end of the movement of the mechanism through the intermediary of the coin with the parts set in position to permit the selection of the bottle or container, dotted lines showing how the main door or closure can be opened and closed and the parts still remain in said "set" position.

An abutment 64 extends upwardly from the forward end of the member 58 and has its forward end curved downwardly and rearwardly for engagement by the segmental abutment 48 of the member 47 when the latter member is rocked with the rod 39 by the opening of the door 41. The rear edge of the abutment 64 has a groove which is aligned with the forward end of the lever 61 and also with the upper edge of a ridge 64' formed in the lower portion of the frame 57 in advance of the forward end of the member 59'. A spring 65 extends between the rear end of the member 58 and the housing of the coin recess 45 and holds said member in its normal position, as shown in Figure 3. The lever 61 has a hook 66 depending from its rear end which, when the forward end of said lever is raised against the resistance of the spring 62, engages an upwardly extending projection 67 of the member 58.

Figure 5:
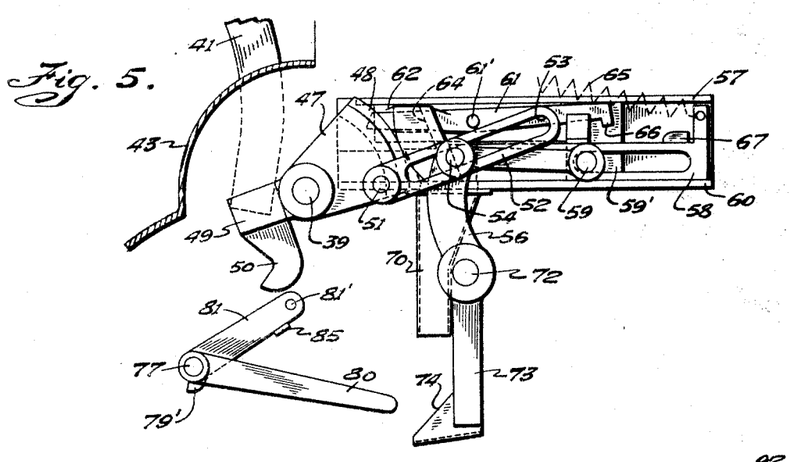
Figure 5 is a view similar to Figure 2 of the mechanism adjacent the coin-controlled mechanism showing the parts in normal position and illustrating how the main door may be opened or closed before a coin is inserted.

When the hook 66 at the rear end of the lever 61 is out of engagement with the projection 67 of the member 58 and the lever 47 is rocked by the opening movement of the door 41 to cause its abutment 47 to bear against the forward end of the member 58, the latter member is free to slide rearwardly independently of the member 59', at which time the pin 54 at the forward end of the link 55 will slide forwardly in the slot 53 of the link 52 and the pin 59 which connects the rear end of the link 55 to the member 59' will slide forwardly in the longitudinal slot 58' of the member 58, as shown in Figure 5.

But when a coin C is inserted in the recess 45 and falls edgewise through the slot 46 to rest upon the ridge 64' between the abutment 64 of the member 58 and the forward end 63 of the lever 61 and the lever 47 is rocked by the opening of the door 41 to cause its abutment 48 to engage the rear end of the member 58, the coin will lift the forward end of the lever 61 against the resistance of the spring 62, thus depressing the rear end of said lever and causing the hook 66 to engage the projection 67 of the member 58 and secure the members 58 and 59' together so that the member 59' will be moved rearwardly with the member 58. The rearward movement of the member 59' will, through its pin 59, draw the link 55 rearwardly, and the coin being moved along the ridge 64' by the abutment 64 will fall off the rear end of said ridge into the chute 70, the parts being moved into the position shown in Figure 4.

During this movement, the lever 56 and the shaft 72 to which it is secured are rocked by the link 55, so that a projection 74 carried by the lower arm 73 of said lever will under ride the lever 80 and rock the same from the position as shown in Figure 3 to that shown in Figure 4. At the same time that the shaft 72 is rocked the arms 75 carried by said shaft are moved from the position as shown in Figure 3 to that shown in Figure 4, so that the rod or link 76 is moved, and, as will presently appear, causes the proper feeding of the bottles or containers to the delivery portion 126.

A shaft 77 is fixedly mounted within the cabinet and is properly supported in any desirable manner and has mounted thereon for oscillation the bushing or sleeve 79 which carries the levers 80 and 81 and also the catch 79'. This lever 80, when engaged by the projection 74, is moved into the full line position in Figure 4, and due to the fact that the sleeve 79 rigidly connects it to the lever 81, said lever 81 is also moved to place its pin 81' in position to be engaged by the hook 50, the purpose of which will presently appear. If the operator continues to move the lid 43 to open position, the pin 81' will be engaged by the hook, but in the event the lid is closed without completing the sale operation, the levers 80 and 81 will assume the dot-and-dash position shown in Figure 4 and be held in such position by engagement by the lever 80 with the pivoted spring-actuated catch 82 (Figures 4 and 10) journaled in the bifurcated end 84 of the plate 83 which, as will presently appear, is an integral member with the oscillatory sleeve 117, said sleeve being supported upon the arm 83' and the pin 83ª.

The parts are now in the position for the purchaser to select the desired filled container or bottle.

*Package door releasing and closing mechanism*

Figures 12, 13:
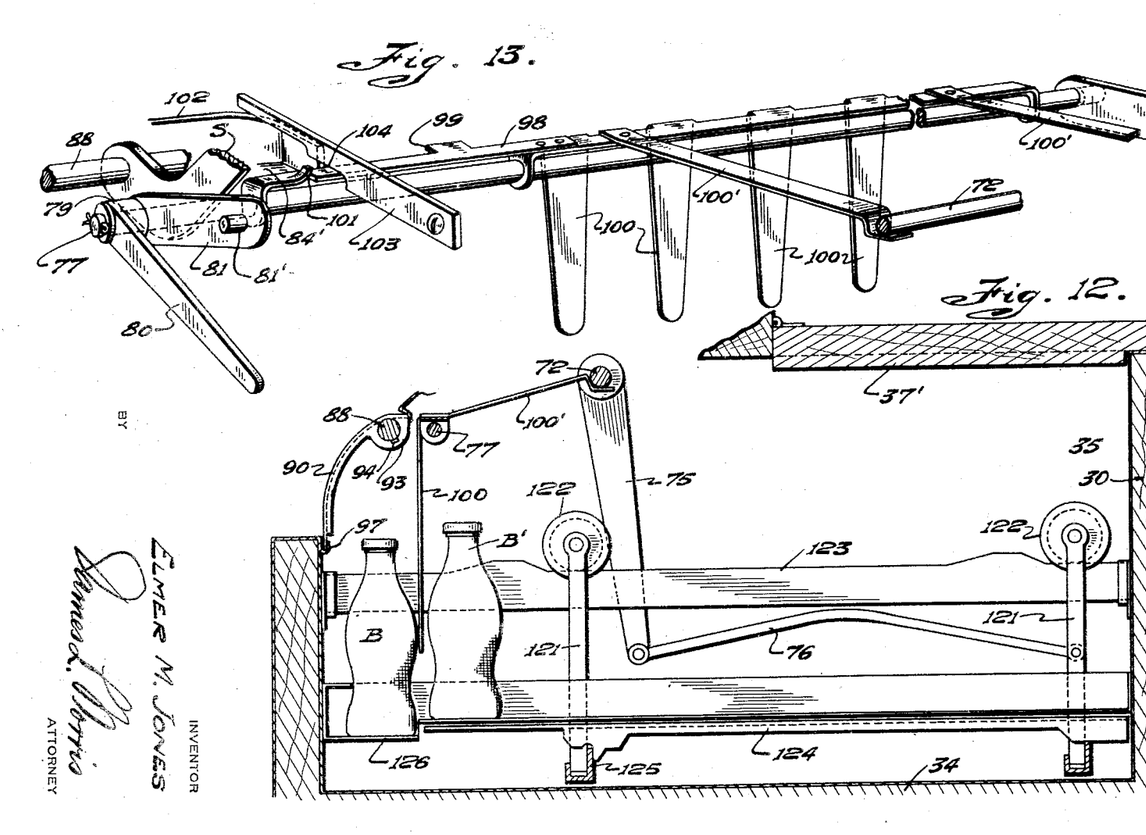
Figure 12 is a vertical cross-sectional view through the bottle or container feeding mechanism with the parts in normal position.
Figure 13 is a perspective view of the controlling and actuating mechanism for the barrier.

A plurality of lids 90, each having a handle 92 (Fig. 6) by means of which it may be moved and an opening 91 through which the bottle immediatey behind the same may be viewed, are arranged side by side within the cabinet behind the main door 41, each above one of a plurality of bottle receptacles 126 (Figure 12). The lower edges of these lids are slidable in a track 97 at the lower edge of the upper opening in the cabinet, and a rock-shaft 88 extends transversely of the cabinet through aligned apertures formed in a pair of lugs or ears 93 which project from the inner side of each of said lids adjacent the upper edges of the latter. Thus the lids 90 are slidable behind the upper opening in the cabinet. Each of the ears or lugs 93 has a slot 94 extending radially from the aperture thereof and the rock-shaft 88 has a plurality of pairs of pins 95 and 96 extending radially therefrom, a pair of pins 95 and 96 being disposed between the ears or lugs 93 of each of the lids 90 except that shown at the right-hand side of Figures 8 and 9. The pins 95 are aligned with one another longitudinally of the shaft 88 and the pins 96 are also aligned with one another longitudinally of the shaft but out of alignment with the pins 95. When the rock-shaft 88 is in its normal position and all of the receptacles 126 are covered by their lids 90, both the pins 95 and the pins 96 are out of alignment with the slots 94 of the ears or lugs 93, as shown in Figure 7. But when any one of the lids 90 is shifted to the right in order to uncover the receptacle 126 covered thereby, said lid will push the lids 90 at the right of same ahead of it and, through the means to be described later, will turn the shaft 88 far enough to bring the pins 96 into alignment with the slots 84 of the left-hand ears 93 of said lids so as to permit said pins to pass through said slots. Continued movement of said lids to the right will turn the shaft 88 further and move the pins 96 out of alignment with said slots and the pins 95 into alignment with said slots so as to permit the pins 95 to pass through said slots. Further movement of said lid to the right to fully uncover the receptacle covered thereby will turn the shaft 88 further to move the pins 95 out of alignment with the slots 94 of the right-hand ears 93 and the pins 96 out of alignment with the slots 84 of the left-hand ears of the lids 90. When said lid is shifted fully to the right, the pins 95 by engagement with the right-hand ears 93 of the shifted lids will prevent movement of such lids to the left, and the pin 96 above the uncovered receptacle and those to the left of such receptacle by engagement with the right-hand ears of the lids to the left of such receptacle, will prevent movement of the latter lids to the right.

It will thus be impossible, after having selected a bottle contained in one of the receptacles 126 and after having uncovered such receptacle by shifting its lid 90 to the right, to uncover another receptacle to remove a bottle therefrom.

Means are provided to normally lock the lids 90 against movement longitudinally of the rock-shaft 88 to the right, as viewed in Figure 8. The means shown for this purpose will now be described.

Figure 6:
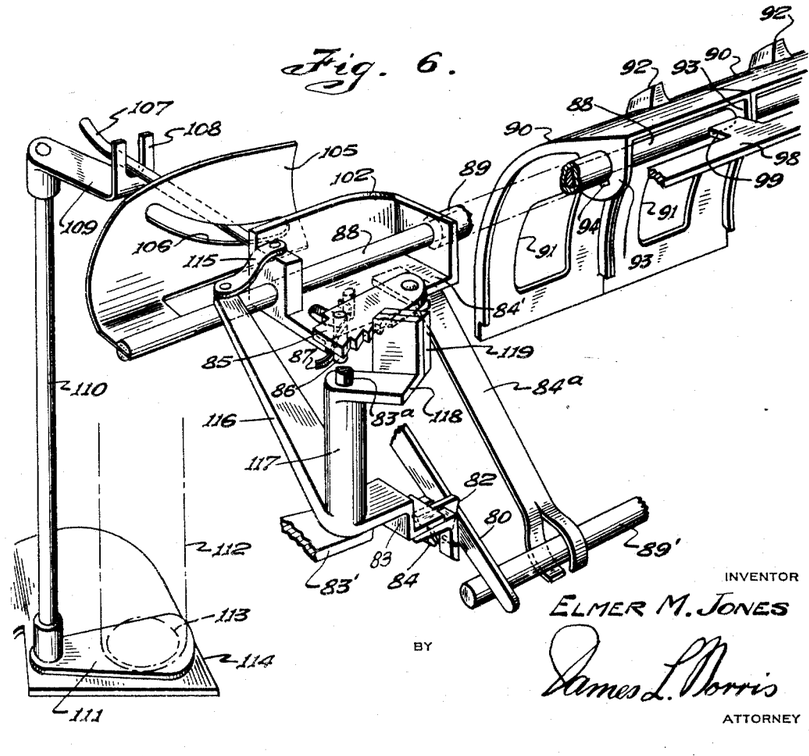
Figure 6 is a perspective view, also partly in section, of the selective lid mechanism, the adjacent portion of the locking mechanism therefor and the refund check delivery mechanism.
Figures 7, 8, 10, 11:
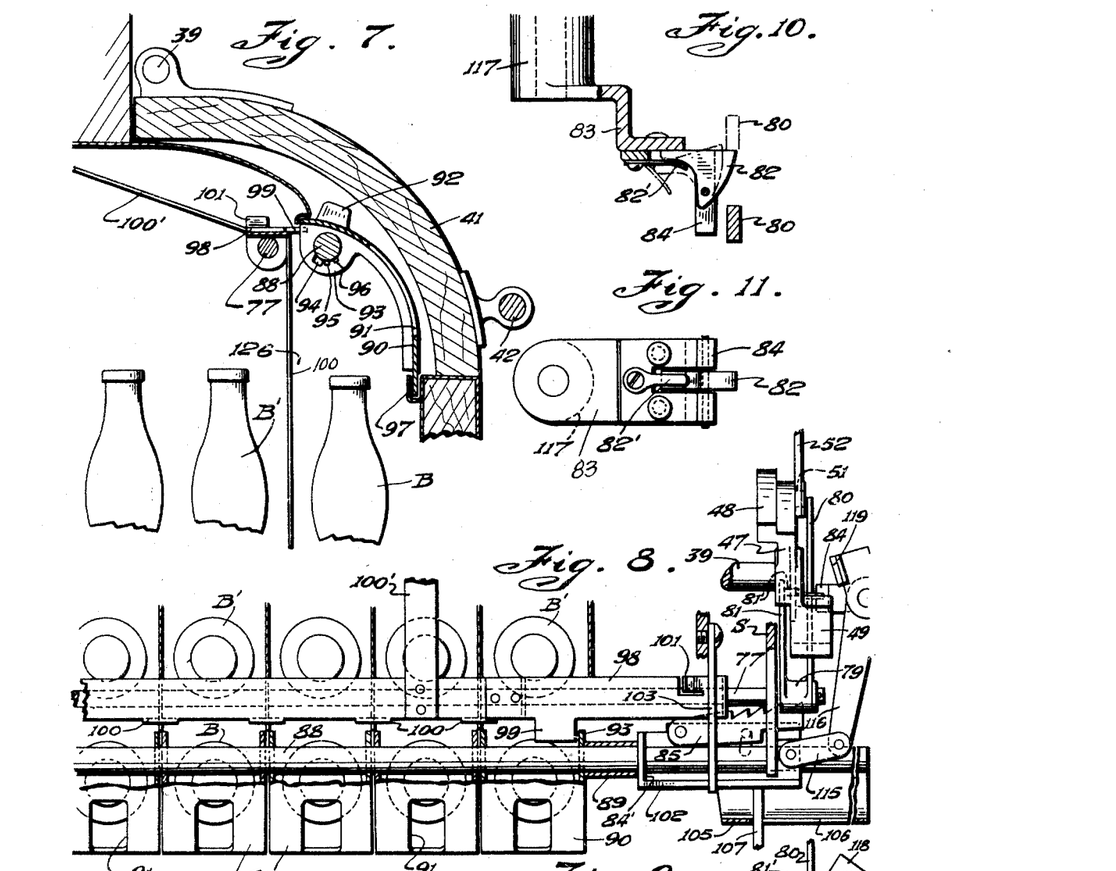
Figure 7 is a vertical sectional view through the upper forward portion of the cabinet showing the parts in the position they assume just prior to the selection of a bottle or container.
Figure 8 is a top plan view, partly in section, of a plurality of the bottle or container selecting lids with the parts in the position they assume after the coin-controlled mechanism has set the parts for selection.
Figure 10 is a vertical sectional view through the trigger mechanism for locking the parts in the position shown in Figure 4.
Figure 11 is a top plan view of said trigger or catch mechanism.

A plate 84', best shown in Figure 6, is mounted to slide longitudinally of the rock-shaft 88 as by means of ears extending upwardly therefrom and having aligned openings through which said rock-shaft extends, and a sleeve 89 is mounted on said rock-shaft between one of said ears and the adjacent lid 90. The plate 84' is supported against tilting movement on the rock-shaft 88 by a member 84ª having its upper end secured to said plate and its lower end bifurcated to straddle a rod 89' which extends transversely of the cabinet parallel to the rock-shaft 88. A plate 85 is pivoted adjacent one of its ends to the upper side of the plate 84' and has a pin 86 projecting from its under side adjacent its other end through an arcuate slot in the plate 84' to limit its rocking movement in either direction. Teeth formed on the rear edge of the plate 85 each has one face directed toward the adjacent end of the rock-shaft 88, and a spring 87 urges said toothed edge beyond the rear edge of the plate 84'. When the levers 80 and 81 are in their normal position, as shown in Figure 3, the catch 79' of the sleeve 79 engages one of the teeth of the plate 85 and thus holds the lids 90 against movement from the position shown in Figure 8 to that shown in Figure 9. But when the lever 73 is rocked from the position shown in Figure 3 to that shown in Figure 4 and the projection 74 carried by its lower arm engages and rocks the lever 80, the catch 79' will be moved out of engagement with the plate 85, whereupon the lids 90, as viewed in Figure 8, will be free to be shifted to the right.

Figure 9:
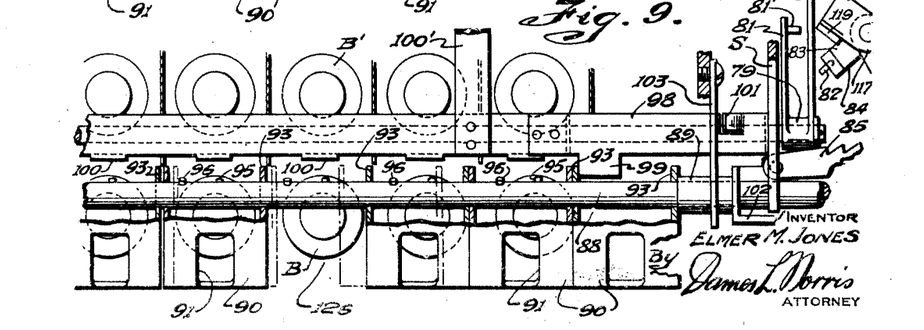
Figure 9 is a view similar to Figure 8 showing one of the lids in a position to uncover its delivery compartment prior to the removal or delivery of the bottle or container therefrom, the dotted line position showing how the lids are locked against retrograde movement.

Mounted for sliding movement upon the fixed shaft 77 which is parallel to the rock-shaft 88, is a frame or barrier carrying member 98 which has upon its front edge a lug 99 disposed to be engaged by the lid 90 at the extreme right of Figures 8 and 9, so that said barrier carrying member may be moved to the right by the opening movement of such lid, or selected lid. The member 98 carries the barriers 100 which are disposed adjacent to and at the rear of the respective receptacles 126, so that the purchaser cannot gain access to the filled container or bottle in the rear of the barrier, as viewed in Figure 9.

This plate 98 is held against tilting movement by means of the arms 100' which project rearwardly and underlie the shaft 72, as particularly shown in Figure 13.

To assist in locking the barrier mechanism against a retrograde movement, a lever 103 is provided. This lever is so pivoted that its free end overlies the barrier and also is disposed in the path of the cam 102 carried by the member 84', the movement of the member 84' to the left as viewed in Figures 6 and 13 permitting the lever 103 to be lowered so that the portion 104 of said lever is placed to the right of the lug 101 upon the barrier carrying member 98 so as to prevent the movement of the barrier in the opposite direction, that is to say, while any of the lids 90 are in open position as shown in Figure 9. The stop S limits the extreme right-hand movement of the barrier which abuts it when moved to the right, (see Fig. 8) to the position shown in Fig. 9.

Carried by the shaft 88, and as particularly viewed in Figure 6, is a curved plate 105 provided with a cam slot 106, through which projects a rod 107 connected to and movable with the plate 84' so that when said plate is moved from right to left of the machine, as viewed in Figs. 8 and 9, or from the left to right, as viewed in Figure 6, said rod 107, riding in the cam slot 106, will be caused to tilt and rock the shaft 88. The rod 107 is seated in the bifurcated end of a lever 109 secured to the upper end of a rock shaft 110, so that when said rod is moved with the plate 84' it will rock the shaft 110 and cause the check ejecting plate 111 carried by the lower end of the shaft 110 to move from below the refund check compartment 112 and permit the lowermost check 113 to fall upon the guide plate 114.

At the same time, through the link 115, the arm 116 is caused to move, and through the sleeve 117, the arm 118 with its buffer 119 is placed in position to be engaged by the projection 49 of the lever 47 during the closing of the main door 41, and as will presently appear. The return of the various lids 90 to normally closed position will, through the plate 84', link 115, and sleeve 117, move the catch 82 from beneath the lever 80 so that the levers 80 and 81 will fall from the dot-and-dash position, as shown in Figure 4, to the full line position as shown in Figure 3, the plate 83 having been moved out of the path of the lever 80 at the same time that the abutment 119 was moved in the path of the projection 49. At the same time that the main door actuates this mechanism to return the lids 90 to closed position, the arm or rod 107 is moved to cause the oscillation through the plate 105 of the shaft 88, and through the lever 109 the check ejector 111 is caused to pass below the check receptacle 112 and eject the refund check disposed in front of the ejector 111 onto the chute 114 and finally into the refund check compartment 114' exteriorly of the cabinet.

*Empty bottle and check returning mechanism*

Figure 14:
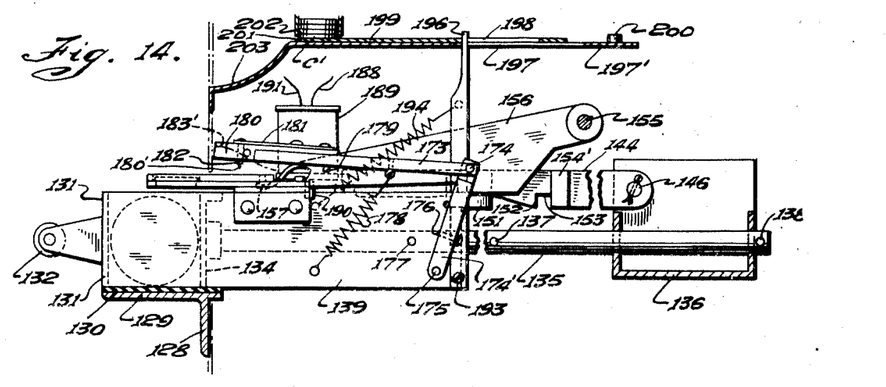
Figure 14 is a view, partly in vertical section and partly in elevation, of the bottle and refund check actuated mechanism, said view also showing the refund coin delivery mechanism in normal position.
Figures 15, 27, 28, 29:
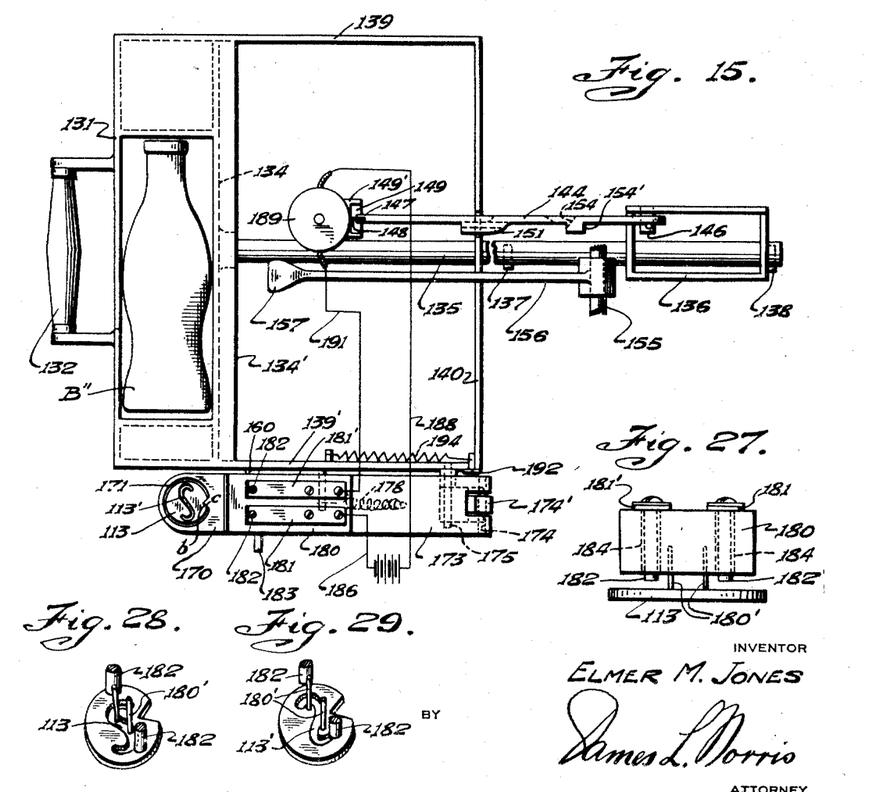
Figure 15 is a horizontal plan view of the mechanism shown in Figure 14 with the parts in normal position.
Figures 27, 28 and 29 are detail views of portions of the return check controlled switch.

After the purchaser has emptied the bottle or container, having previously received the check from the receptacle 114', in order to obtain the refund coin, it is necessary that the bottle B" be placed in the position as shown in Figures 14 and 15 with the check 113 also as shown in Figure 15.

Mounted upon the forward portion of the cabinet is a plate 128 carrying a shelf 129, the upper face of which is provided with a strip 130 of a flexible material, preferably corrugated rubber or a similar material, and this material constitutes the bottom for the slidable bottle container or drawer 131 which is manipulated by the handle 132. The rear wall 134 of the drawer has connected thereto and extending rearwardly therefrom a cylindrical rod 135 which is guided in the frame 136 within the cabinet, pins 137 and 138 being carried by said rod and abutting, respectively, against the forward and rear ends of the frame 136 to limit the full inward or outward movement of the drawer 131 and the connected mechanism.

Carried by the drawer and extending rearwardly thereof are the two plates 139 connected by the cross-plate 140, said cross-plate, as illustrated in diagram in Figures 20 to 26, being provided with the two notches 141 and 142 which provide the central lug 143 having the curved or cam surface 143', the purpose of which will presently appear.

Figure 21:
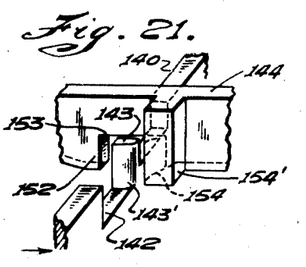
Figure 21 is a perspective view of part of the mechanism shown in Figures 14, 15 and 20, the parts being shown in the position they assume when the bottle is about to be deposited.
Figure 22:
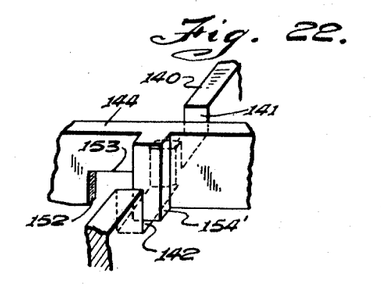
Figure 22 is a view similar to Figure 21 but showing the parts in the position they assume after the bottle has been deposited and prior to the return movement of the bottle drawer.
Figure 26:
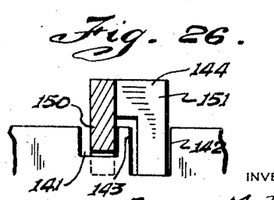
Figure 26 is a view similar to Figure 25, the parts being shown in the position they assume when the bottle receptacle or drawer is fully extended.

A pin 146 carried by a side member of the frame 136 extends through an aperture 145 at the rear end of a lever 144. The lever is thus mounted both to rock vertically and to slide horizontally. Upon the forward end 147 of the lever is mounted a block 148 of insulating material which fits within the recess 149 of the plate 149' adjacent the solenoid 189. Thus when the parts are in the position as shown in Figures 14 and 15, the lug 143 is in the position as shown in Figure 26 and when the drawer is moved to the rear, as will presently appear, said lug will pass upon the right-hand side of the lever 144, as viewed in Figure 26, and continue in said position until it assumes the position as shown in dotted lines in Figure 24, at which time the lever 144 will have been moved so as to place the projection 152 thereof in line with the lug 143, with the lug 143 in the recess 153, so that in the event the purchaser attempts to pull the drawer outwardly, the lug 143 will engage the projection 152 and thus lock the parts against such retrograde movement. The continued inward movement of the drawer will place the cam edge 143' of the lug 143 against the inclined face 154 of the lug 154' and thus cause the lever 144 to be moved from the position as shown in Figure 21 to the position as shown in Figure 22.

Figure 23:
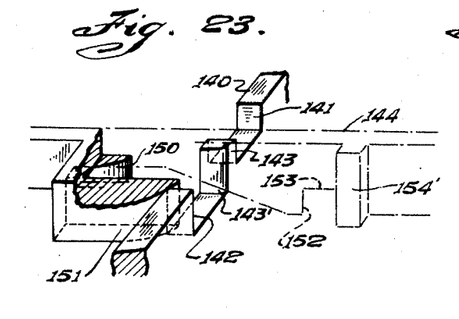
Figure 23 is a view similar to Figure 21 of the parts in the position they assume just prior to the final full opening of the drawer.
Figure 24:
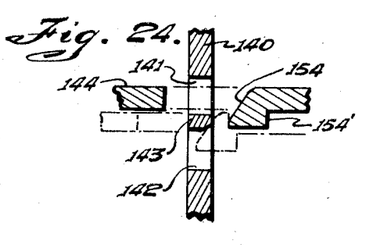
Figure 24 is a transverse sectional view through the parts shown in Figures 21 and 22, said parts being in the position as shown in Figure 21.
Figure 25:
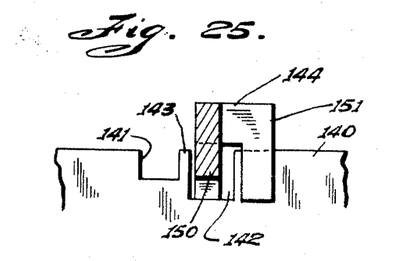
Figure 25 is a view in elevation of a portion of the rear member of the drawer as viewed from the front thereof and showing the retrograde movement preventing device in the position as shown in Figure 23.

The return movement of the drawer 131 will then cause the lug 143 to pass upon the left-hand or upper side of the bar 144 until one edge of the slot 142 engages the cam face 151' of the lug 151, at which time the lug will move from the position as shown in Figure 23 to that shown in Figure 26, with the lug 143 between the respective lugs 150' and 151.

By this means the door and its mechanism is prevented from being opened until after the bottle has been deposited.

Figures 17, 18, 19:
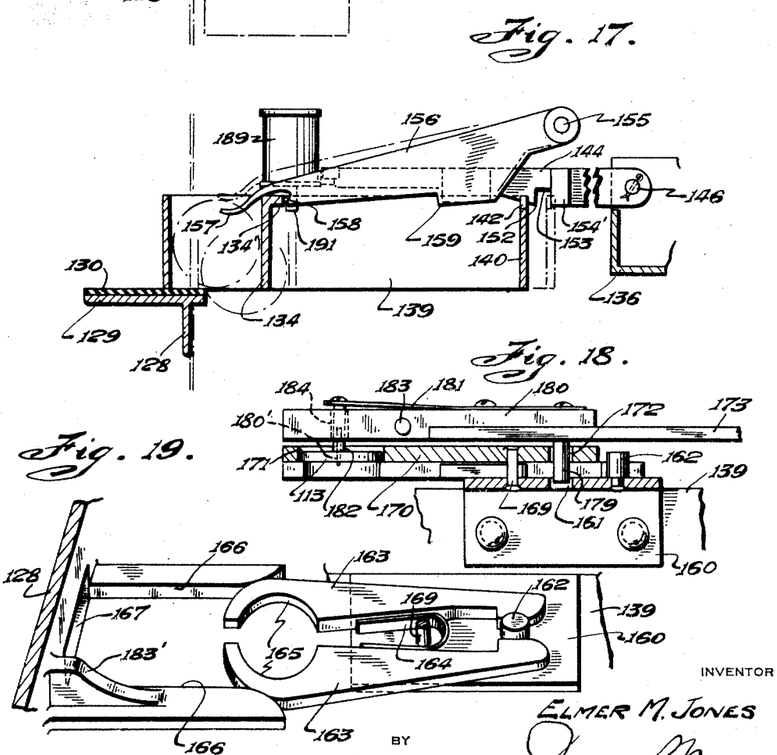
Figure 17 is a view partly in vertical section and partly in elevation of the locking devices for the return bottle or container mechanism, the same being in a position just prior to the delivery of the empty bottle.
Figure 18 is a vertical sectional view of the refund check actuated mechanism.
Figure 19 is a detail perspective view of the refund check clamping and releasing device in the position it assumes in releasing the check.
Figure 20:
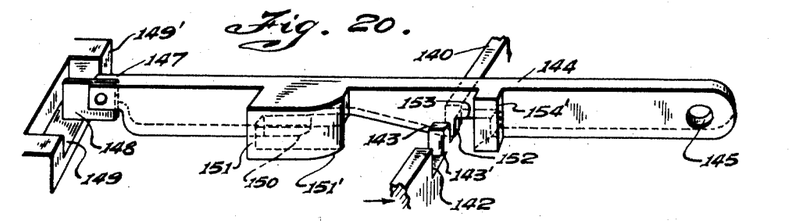
Figure 20 is a perspective view of the mechanism for preventing the retrograde movement of the return bottle mechanism, the parts being shown in the position they assume when approaching their rearmost position.

There are two devices, one controlled by the bottle and the other controlled by the check, which must operate simultaneously, or nearly so, before the drawer 131 is released from its locked position, as shown in Figures 14 and 15, so that the purchaser may push the drawer to the rear and cause the operation of the retrograde movement preventing device 144, and this includes the shaft 155 and the lever 156. This lever is provided with the bottle-engaging finger 157 at the free end thereof and is normally permitted to fall by gravity in the path of the bottle. In normal position the abutment 159 rides on the edge of the plate 140 and the lock 158 is elevated. This permits a slight free movement to the drawer, but when the drawer is moved rearwardly, the plate 140 moves from below the lug 159 and the lever falls to place its lock 158 in engagement with the ledge 134' of the partition 134 of the drawer. Thus with a bottle in the drawer and the drawer pushed inwardly, the engagement of the bottle with the end 157 elevates the lever 156 and this lock is released. Carried by the drawer and attached to the plate 139 thereof is a bracket or arm 160 which, as shown in Figures 15, 18, and 19 is provided with an aperture 161 and has attached thereto a limiting pin 162 and the two expansible coin clamping jaws 163 which are normally held apart by means of the U-shaped spring 164 so that the free ends 165 will be normally opened, such open position being limited by the pin 162. As the drawer is moved forward or into open position the free ends 165 are directed between the fixed guides 166 which close said jaws for the reception of the check 113 after the said jaws have been projected exteriorly of the slot 167.

A rivet 169 connects the plate 170 to act as a closure for the coin-receiving clamping member 163 to the bracket 160 and this plate 170 is provided with the check receptacle 171 for the reception of the refund check 113, or, as clearly shown in Figure 18.

This check 113 is provided with a modified S-shaped opening 113' therethrough and with the notch $b$ at the peripheral edge thereof, the latter being provided so as to align with the projection $c$ of the plate 170 and thus position the check so that the circuit to the electro-magnet or solenoid 189 may be closed by the check, the opening 113' being so formed that the circuit closing pins 182 are bridged only when the check assumes this position, and as clearly illustrated in Figures 15 and 18. The plate 170 is also provided with an opening 172 which aligns with the opening 161 of the bracket, the purpose of which will presently appear.

Figure 16:
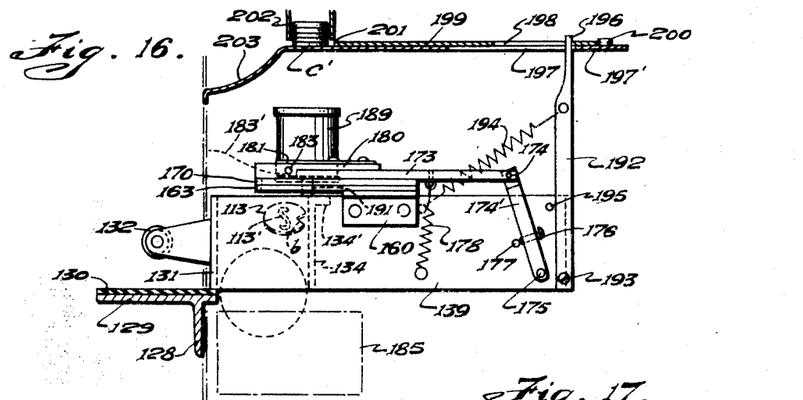
Figure 16 is a view similar to Figure 14 showing the parts in the position they assume at the innermost stroke of the bottle and refund check depositing mechanism.

The plate 173 is hingedly connected at 174 to the arm 174', which arm is pivoted at 175 to the side 139, a limiting screw 176 being carried thereby for cooperation with the pin 177 to limit the forward movement of the plate 173 which is normally propelled forwardly by the spring 178 and causes the pin 183 to ride on the cam 183' so that the free end 180 thereof will be held forwardly and upwardly in engagement with the inner face of the casing, or as illustrated in Figure 14. Thus, as the drawer is moved inwardly, the action of the lever or arm 174' being moved rearwardly and imparted by the spring 178, causes the end 180 to move downwardly placing the pin 179 in the openings 172 and 161, thus locking the plate 173 against forward and rearward movements so that if the check 113 is properly placed the pins 180' will pass through the slots and permit the circuit closing pins 182 to be projected through the apertures 184 and into engagement with the refund check 113, said pins being carried by the spring contact plates 181 and 181' which are connected to the block of insulation 180 and thus insulated from the plate or carrying member 173. The circuit for energizing the solenoid 189 includes a battery or other source of electricity 187, the conductor 188, the solenoid 189, the conductor 191, one plate 181', its contact 182, the refund check 113, the remaining contact point 182, the remaining plate 181, and the conductor 186. This action causes the withdrawal of the core 190 of the solenoid 189 from the rear of the projection 134' of the partition 134 of the drawer and thus with this elevated and with the bottle actuated lever 156 also elevated the drawer is free and can be moved to the rear to cause the bottle to assume the position as shown in Figures 14, 17 and 16, respectively, and wherein the bottle B'' is delivered into the receptacle 33, as will later appear.

At the same time, the check-receiving mechanism is moved to the rear and until the jaws 165 are released to the action of the spring 164 from the guides 166, at which time the refund check is released to the action of the spring tension of the plates 181, 181' and their contact pins 182 which assist in ejecting the check so that the same will fall and enter the refund check compartment 185.

*Refund coin delivery mechanism*

This mechanism comprises the lever 192 which is pivoted at 193 to the side 139 of the drawer and by means of the spring 194 is held toward the stop 195, thus limiting the forward movement of said lever and its coin slide manipulating end 196. This end is projected upwardly and through the slots 197 and 198 of the respective fixed portion 197' of the casing and the coin ejecting slide 199 which is limited in its rearward movement by means of the pin 200. The forward end 201 of the slide 199 is disposed to pass below the refund coin slot 202 and to engage the lowermost coin C' so that upon the forward movement or opening of the drawer 131 the end 196 of the lever 192 will engage the plate 199 and move it from the position as shown in Figure 16 to a forward position or under the chute 202 to eject the lowermost coin into the coin receptacle 203 where the same may be removed by the purchaser.

It will thus be seen by this mechanism that the purchaser is permitted to view the contents beneath the lids 90 before selecting, but that said lids cannot be manipulated until after the introduction of the coin within the slot 46 and the opening of the main door 41; that the manipulation of the main door after this procedure will not interfere with the final selecting of the lid 90 but that one lid 90 must be manipulated to have access to any one of the delivery compartments and the article contained therein, and said lid must be closed before the refund check is delivered and that in order to receive the refund coin it is necessary that both the empty container and the refund check must be placed in proper position and the drawer 131 manipulated to rearmost position and again opened fully before the refund coin is released for delivery to the purchaser.

In order that the returned empty bottle or container may be eased downwardly in its fall from the time it is delivered to the drawer 131, a reticulated bottom 195 receives the same while the swinging barrier 196 checks the fall and is operated by the gravity of the empty bottle and moved rearwardly so as to swing the arms 197 and permit the bottle to engage the apron 198 and fall by gravity therefrom upon the screen 199 before finally falling into the empty bottle compartment 33.

The bottle or container supplying mechanism is similar to the mechanism shown in my co-pending application filed January 7, 1929, Serial No. 330,844, and is, therefore, only shown diagrammatically in Figure 12, the same being operated as previously stated by means of the crank 75 and the connecting rod 76 which is connected to the sliding frame 121 guided by rollers 122 upon the cam rod 123, one at each side, so that when the sliding frame is moved forwardly, as viewed in Figure 12, the bar 125 will elevate the ramps 124, one to each row of bottles B', so that the said bottles will be moved forwardly when the receptacle 126 is empty, said receptacle being below its respective door 90 so that upon each manipulation of the lever 75 as long as there are bottles in the respective framework above the respective ramps 124, said bottles will be delivered successively.

From the foregoing description, it is evident that the respective lids or covers 90 cannot be manipulated until a coin has been deposited and the main cover 41 elevated as the lever 47 carried by said door manipulates the releasing mechanism that permits the selection and sliding to open position of any one of the respective lids, be it the one to the extreme right or the extreme left, or any one of the intermediate ones, and that by means of the cam slot plate 105 and the rod 107 the rocking shaft 88, with its pins 95 and 96, will be manipulated to permit the proper sliding of the lids to the right but will lock the movement of those to the left and also any retrograde movement of the one or ones being moved to the right, such action also simultaneously placing the barriers 100 in front of the bottles B' so that the purchaser has access only to the exposed bottle below the selected lid.

It is also evident that any movement to the left, after the movement has been started to the right, will be checked by the pins 95 and 96, and that the movement must be continued to the right in order that the selected bottle or container may be removed. Thus, it is impossible to manipulate the lids 90 after the mechanism has once been released for selection so that more than one compartment 126 may be opened. It is also apparent that when the lids are once opened they cannot be manually manipulated from right to left, as viewed in Figure 9, and such manipulation can only be accomplished by the closing of the main door 41 through the engagement of the lug 49 with the projection 119 to move the lever 116 and, through the link 115, to reset the parts in the position as shown in Figure 8, and also the resetting of the sleeve 79 so that the catch 79' thereof will be placed in position to engage the teeth 86 of the trigger or catch 85.

It is also apparent from the present description that it is impossible to return the empty bottle or container by means of the drawer 131 without the check 113, or the check 113 without the bottle, and that the bottle and check must be properly positioned within their receptacles so that the drawer 131 can be moved fully inwardly. Such movement is locked against retrograde movement after the drawer has been moved sufficiently far to release the lug 159 from the partition 140, the bottle has elevated the lever 156, and the check 113 has closed the circuit. The drawer can now be moved to its full rearward position, releasing the empty bottle and the refund check. At this time, the coin C' is in position to be ejected, the ejection requiring the final full manual opening of the drawer 131 before the purchaser receives the refund coin.

I claim:

1. A vending apparatus including, in combination, a cabinet, a main closure for said cabinet, a filled package supplying mechanism operably connected to the main closure, a manually operable auxiliary closure, a lock for said auxiliary closure, and coin-controlled means operable by the main closure for releasing said lock.

2. A vending apparatus including, in combination, a cabinet, a main closure for said cabinet, a filled package supplying mechanism operably connected to the main closure, a manually operable auxiliary closure, a lock for said auxiliary closure, coin-controlled means operable by the movement of the main closure into open position for releasing said lock, and mechanism operated by the closing of the main closure to move the auxiliary closure to closed and locked position.

3. A vending apparatus including, in combination, a cabinet, a main closure for said cabinet, a filled package supplying mechanism operably connected to the main closure, a manually operable auxiliary closure, a lock for said auxiliary closure, coin-controlled means operable by the movement of the main closure into open position for releasing said lock, and a step-by-step retrograde movement preventing means operable when the auxiliary closure is closed manually and/or by the main closure.

4. In a vending machine, the combination of a cabinet, a main manually operable closure therefor, a package dispensing apparatus mounted in the cabinet and having a package receptacle adjacent the main closure, a slidable lid between said main closure and said package receptacle, a lock for said lid, means operable by the opening of said main closure for releasing said lock, a barrier movable into position behind the package receptacle by the movement of the lid into open position, and means operable by the movement of the main closure into closed position for closing said lid simultaneously with the closing of the main closure.

5. In a vending machine, the combination of a cabinet, a main manually operable closure therefor, a package dispensing apparatus mounted in the cabinet and having a package receptacle adjacent the main closure, a slidable lid between said main closure and said package receptacle, a lock for said lid, coin-controlled means operative by said main closure for releasing said lock, a barrier movable into and out of position behind said package receptacle by the movement of said lid into open and closed position, means operable by the closing movement of the main closure for closing said lid simultaneously with the closing of the main closure, and automatic means for preventing retrograde movement of the lid after it has been started in its movement to open position.

6. In a vending machine, the combination of a cabinet, a main manually operable closure therefor, a package dispensing apparatus mounted in the cabinet and having a package receptacle adjacent the main closure, a slidable lid between said main closure and package receptacle, a lock for said lid, coin-controlled means operative by said main closure for releasing said lock, a barrier associated with said lid and movable into and out of position behind said package receptacle by the movement of said lid into and out of closed position, means associated with said main closure and said lock-releasing means for moving said lid to closed position simultaneously with the closing of the main closure, and means for locking the barrier against a retrograde movement while the lid is moving into and remains in open position.

7. In a vending machine, the combination of a cabinet, a main manually operable closure therefor, a package dispensing apparatus mounted in the cabinet and having a package delivering receptacle adjacent the main closure, a slidable lid between said main closure and package receptacle, a lock for said lid, coin-controlled means operative by said main closure for releasing said lock, a barrier movable into and out of position behind said package receptacles by the movement of said lid into and out of closed position, means operable by the movement of the main closure into closed position to close said lid, means for locking the barrier against a retrograde movement while the lid moves into and while it is in open position, and automatic means operable by the opening movement of the lid for preventing retrograde movement of the lid after it has been started in its movement to open position.

8. In a vending machine, the combination of a cabinet, a main manually operable closure therefor, a package dispensing apparatus mounted in the cabinet and having a package receptacle adjacent the main closure, a lid slidable between said main closure and package receptacle, a lock for said lid, coin-controlled means operable by the main closure in its opening movement to release said lock, a barrier operably connected to said lid and disposed between the main closure and package receptacle as the lid is manually opened after the lock is released, and means between the lid and the main closure to cause the lid to be closed simultaneously with the closing of the main closure.

9. In a vending machine, the combination of a cabinet a main manually operable closure therefore, a package dispensing apparatus mounted in the cabinet and having a package receptacle adjacent the main closure, a slidable lid between said main closure and package receptacle, means normally locking said lid in closed position, means operable by the opening movement of said main closure for releasing said locking means, a barrier movable into position behind said package receptacle by said lid in the movement of said lid to open position, means for securing said barrier in said position while said lid remains in open position, means operable by said main closure in its movement to closed position to close said lid and restore said barrier to normal position, and automatic means for preventing retrograde movement of the lid after it has been started in its movement to open position.

10. In a package vending machine, the combination of a cabinet, a main closure for the cabinet, a plurality of package receptacles behind said closure, means for delivering packages to said receptacles, a plurality of lids each disposed between said main closure and one of said receptacles, means for normally locking said lids in closed position, coin-controlled means operable by the opening movement of the main closure for releasing said lid locking means, means operable by the opening of any of said lids for preventing the opening of the other lids, and means operable by said main closure in its closing movement for closing the opened lid.

11. A package vending machine according to claim 10, including a reciprocatory barrier movable between the delivery mechanism and the package receptacle and means operable by the lid in its opening and closing movements for moving said barrier into and out of position between said mechanism and said receptacle.

12. A package vending machine according to claim 10, wherein the means operable by the opening movement of any of the lids for preventing the opening of the other lids comprises a rock-shaft and means carried by said rock-shaft to engage said other lids.

13. A package vending machine according to claim 10, including a plurality of barriers and means operable by the opening of any of the lids for moving said barriers into position between the packages immediately behind said lids and the next succeeding packages.

14. In a package vending machine, the combination of a cabinet provided with a dispensing chamber, a main closure for said chamber, a pair of levers actuated by said closure in its opening and closing movements, a plurality of slidable selective dispensing lids, means normally locking said lids in closed position, means sequentially operated by said pair of levers during the opening movement of said main closure to release said locking means, and means operated by one of said pair of levers during the closing movement of said main closure for resetting said lids in closed position.

15. A package vending machine according to claim 14, including means actuated by one of the pair of levers for advancing packages toward the dispensing lids.

In testimony whereof I have hereunto set my hand.

ELMER M. JONES.